US012658170B2

(12) United States Patent
Von Elling et al.

(10) Patent No.: US 12,658,170 B2
(45) Date of Patent: Jun. 16, 2026

(54) NOISE REDUCTION SYSTEM HAVING A COMBINATION UNIT, METHOD OF OPERATING THE SYSTEM AND USE OF THE SAME

(71) Applicant: recalm GmbH, Hamburg (DE)

(72) Inventors: Marc Von Elling, Hamburg (DE); Julius Haeuslein, Hamburg (DE)

(73) Assignee: recalm GmbH, Leutkirch im Allgaeu (DE)

( * ) Notice: Subject to any disclaimer, the term of this patent is extended or adjusted under 35 U.S.C. 154(b) by 188 days.

(21) Appl. No.: 18/220,956

(22) Filed: Jul. 12, 2023

(65) Prior Publication Data

US 2024/0029704 A1 Jan. 25, 2024

(30) Foreign Application Priority Data

Jul. 19, 2022 (DE) ..................... 10 2022 118 019.0

(51) Int. Cl.
*G10K 11/178* (2006.01)

(52) U.S. Cl.
CPC .. *G10K 11/17873* (2018.01); *G10K 11/17813* (2018.01)

(58) Field of Classification Search
CPC .................... G10K 11/17873; G10K 11/17813
USPC ......................................................... 381/71.4
See application file for complete search history.

(56) References Cited

U.S. PATENT DOCUMENTS 4,829,590 A 5/1989 Ghose
5,381,485 A 1/1995 Elliott
2015/0172813 A1 6/2015 Goto et al.
2017/0330551 A1* 11/2017 Zafeiropoulos .. G10K 11/17879
2019/0051283 A1* 2/2019 Malka .................. G10K 11/178
2020/0074976 A1 3/2020 Torres et al.
(Continued)

FOREIGN PATENT DOCUMENTS

WO 2021/250237 A1 12/2021

OTHER PUBLICATIONS

Nygren, J., “Active Noise Control with Virtual Reference Signals in an FXLMS Algorithm” TRITA SCI GRU 2018:364.
(Continued)

*Primary Examiner* — Vivian C Chin
*Assistant Examiner* — Douglas J Suthers
(74) *Attorney, Agent, or Firm* — Scully, Scott, Murphy & Presser, P.C.

(57) ABSTRACT

A noise reduction system for actively compensating background noise in a noise reduction area in a transport area of a vehicle, the system includes a controller, at least one sensor detecting the background noise of the noise source, a sound generator generating anti-noise and at least one error-microphone to pick up background noise and anti-noise from the sound generator. The system includes sensors for detecting the background noise and are arranged at different positions in the vehicle, wherein each sensor generates a reference signal and the controller comprises a combination unit coupled to the sensors to receive the reference signals, the combination unit determines a virtual reference signal from the reference signals and is coupled to the dynamic adjustment unit in that the virtual reference signal is input to the anti-noise unit, for generating the anti-noise signal on a basis of the virtual reference signal.

15 Claims, 6 Drawing Sheets

(56) References Cited

U.S. PATENT DOCUMENTS

| | | | | |
|---|---|---|---|---|
| 2021/0323562 | A1 | 10/2021 | You et al. | |
| 2023/0282193 | A1* | 9/2023 | Cha | G06N 3/048 |

OTHER PUBLICATIONS

Akiho, M., et al., "Virtual reference signals for active noise cancellation system", J. Acoust. Soc. Jpn. (E) 19, 2, 1998.

Patel V. et al., "Design and Implementation of an Active Noise Control Headphone With Directional Hear-Through Capability", IEEE Transactions on Consumer Electronics, vol. 66, No. 1, Feb. 2020.

* cited by examiner

NOISE REDUCTION SYSTEM HAVING A COMBINATION UNIT, METHOD OF OPERATING THE SYSTEM AND USE OF THE SAME

CROSS-REFERENCE TO RELATED APPLICATION

The present application is based upon and claims the benefit of priority from DE 10 2022 118 019.0 filed on Jul. 19, 2022, the entire contents of which is incorporated herein by reference.

BACKGROUND

Field

The present disclosure relates to a noise reduction system and more particularly to a noise reduction system for actively compensating background noise generated by a noise source in a noise reduction area in a passenger transport area of a vehicle. The present disclosure also relates to the use of the noise reduction system. Furthermore, the present disclosure relates to a method of operating such a noise reduction system and to use of such system.

Prior Art

Noise reduction systems are known in various configurations. Noise reduction systems are also referred to as noise suppression systems, background noise suppression systems, background noise reduction systems and noise-canceling systems. A distinction is made between active and passive systems. In case of a passive system, sound-absorption materials are applied in order to reduce the undesired background noise in for example a passenger area of a vehicle. In active noise reduction systems, which are also referred to as active noise-canceling systems or active noise control systems (often abbreviated as "ANC"), active noise compensation by means of anti-noise (also referred to as "counter noise") is applied. The anti-noise is superimposed on the undesired background noise in that the background noise is reduced or almost completely eliminated in a quiet zone by means of destructive interference.

In the context of this disclosure, only active noise reduction systems are explained, even if these are not explicitly referred to as active noise reduction systems but rather merely as noise reduction systems.

Generally, noise reduction systems are driven by minimizing an error signal, which indicates the residual noise that cannot be canceled by the noise reduction system. To provide efficient noise-canceling, the residual noise near or at the auditory channel of the ear of the user should be minimized. To estimate said noise at a position in which no physical microphone can be placed or is not desired to be placed, the concept of "virtual microphones" has been established. This concept is basically described, for example in U.S. Pat. No. 5,381,485.

Active noise canceling systems can be designed as feedforward noise-canceling setups, in which a sensor, also referred to as a reference sensor, detects the background noise of a noise source. The reference microphone detects the background noise of a noise source, the noise of which should be eliminated in the noise reduction area. An anti-noise filter drives a sound generator that emits the anti-noise and uses the signal of the reference microphone. The output of the anti-noise filter is not only used for driving the sound generator but is also input to a further filter. This is configured to estimate a muting signal representing the anti-noise at the position of the before mentioned virtual microphone. By subtracting the estimated muting signal from the estimated signal, which is the background noise and the anti-noise, the error signal can be derived. The error signal represents a cost function of the noise reduction system. By minimizing the value of the error function, the noise-canceling system is dynamically adapted to the noise generated by the noise source and by that, efficient noise reduction at the position of the virtual microphone can be achieved.

The overall performance of feedforward noise canceling systems highly depends on the quality of the reference signal, which is detected by the sensor and is indicative of the background noise. The reference signal is needed to guarantee a proper noise-canceling effect.

US 2020/0074976 A1 discloses a noise-canceling system applying a virtual microphone concept. For adaption of the noise-canceling filter, a finite impulse response (FIR) filter is applied. Furthermore, the known system can apply a plurality of reference sensors for detection of the background noise. Every reference signal is input to the filter, which is designed to adapt the parameters of the noise-canceling algorithm. A multi input multi output (MIMO) system is applied to reflect the multiple signals of the reference sensors.

Furthermore, in the system, which is known from US 2020/0074976 A1, a Wiener Filter can be applied for the analysis of the multiplicity of reference signals. Within this context, also a predictive Wiener Filter can be applied. The parallel processing of the multiplicity of reference signals in the MIMO-setup, however, places a significant computational burden on the processing unit.

SUMMARY

In view of the above, it is an object to provide a noise reduction system for actively compensating background noise, a method of operating such a system and use of said system, wherein efficient noise reduction shall be provided, while lowering the computation burden on the processing units.

Such object can be solved by a noise reduction system for actively compensating background noise generated by a noise source in a noise reduction area in a passenger transport area of a vehicle, the system comprising a controller comprising hardware, at least one reference sensor for detecting the background noise of the noise source, a sound generator for generating anti-noise for superimposing the anti-noise with the background noise in the noise reduction area for active reduction of the background noise, and an error microphone, being configured to pick up background noise emitted by the noise source and anti-noise emitted by the sound generator, wherein a noise canceling algorithm is implemented in the controller, comprising an anti-noise unit for generating an anti-noise signal for driving the sound generator in that it generates the anti-noise. The noise reduction system can be further enhanced in that the system can comprise a plurality of reference sensors for detecting the background noise of the noise source, the plurality of reference sensors being arranged at different positions in the vehicle, wherein each reference sensor of the plurality of reference sensors is configured to generate a reference signal, the controller can further comprise at least one combination unit, said combination unit being coupled to at least two of the plurality of reference sensors and being configured to receive the reference signals of the coupled reference sensors, wherein the combination unit is further configured to determine a virtual reference signal from the reference signals and the combination unit is coupled to the anti-noise unit in that the virtual reference signal is input to the anti-noise unit, which is configured to generate the anti-noise signal on a basis of the virtual reference signal.

In theory, in a 3D-space with distributed noise sources, an infinite number of reference microphones may be needed to locate all sources and to guarantee a perfect noise canceling effect. Naturally, this is not achievable in practical implementations. Prior art solutions apply a multi input multi output (MIMO) approach that, however, suffers from a high computational load on the processing units. Therefore, this approach is limited in practical implementations. By introducing the combination unit, which represents a multiple input single output device (MISO-device), a virtual reference signal can be provided that allows proper noise canceling, without a need for parallel processing. The combinational logic of the combination unit increases the coherence of the multiplicity of reference signals in a single general virtual reference signal. In other words, a virtual reference is calculated from multiple inputs. This new approach does not only relieve the processing unit from the high computational load, the virtual reference signal also enhances the performance of the noise canceling.

The noise canceling algorithm, that is implemented in the controller, can be an arbitrary suitable noise canceling algorithm, that is based for example on one or more of the following filters or algorithms: FxLMS (filtered at least main square), FsLMS (filtered-s least main square), a neuronal network, a statistic FIR-filter (finite impulse response) or the like.

According to an embodiment, the noise reduction system can be further enhanced in that the combination unit can be configured to determine the virtual reference signal from the reference signals for a future point in time.

Signal processing or filtering inevitably produces a certain signal latency. Furthermore, there is a certain signal propagation delay for the anti-noise, which propagates from the sound generator to the quiet zone. These two effects represent the major influence on signal delay. This is why the combination unit is configured to determine the reference signal for the noise generator for a future point in time. For example, the combination unit can be configured to determine the virtual reference signal for a future point in time in that the signal delay that is caused by the combination unit itself is compensated for.

When considering the signal propagation delay on the so-called secondary path from the sound generator to the quiet zone, the needed time interval for determination of the future point in time, can be predicted by using the group delay of the anti-noise signal on the secondary path.

According to an embodiment, the before mentioned future point in time can be calculated from a maximum value of the group delay of the anti-noise on the secondary path. In addition to the signal propagation delay (first delay) on the secondary path, there is delay caused by signal processing. This second delay can also be taken into account, for example, in addition to the first delay.

The future prediction of the virtual reference signal, which can be applied for calculating a signal driving the sound generator can be determined by appropriate definition of a Wiener Filter and the calculation of the Wiener Hopf equation. Furthermore, the determination of the virtual reference signal for the future point in time can be performed by a neuronal network and appropriate training of the neuronal network. More details concerning the training of the neuronal network will be given further below.

According to another embodiment, at least one of the reference signals can be band-pass filtered. In other words, only the frequencies in the reference signals that are inside a certain frequency range or interval can be considered. For example, the signal can be filtered using a frequency window, which ranges from 50 Hz to 350 Hz. A band pass filter can be applied on selected ones of the reference signals or can be applied on all reference signals. According to another embodiment, the reference sensors and the reference signals, respectively, can be grouped, for example into a first group and the second group or set. A band-pass filter can be applied on a selected one of the named set of signals.

Furthermore, when referring back to the above mentioned group delay, the maximum value of the group delay can be determined in this particular frequency interval. For example, firstly, the group delay for the left and the right channel for all frequencies inside this frequency window can be determined. In a second step, the maximum value for the group delay can be determined, wherein for example, both, the left and the right channel, can be considered. The resulting maximum delay can be applied for estimation of the future point in time and the Wiener Filter or the neuronal network can be adapted or designed for calculation of an appropriate virtual reference signal for said future point in time.

According to another embodiment, the sensors, which are configured to generate the reference signals, can be microphones or acceleration sensors. The sensors can be placed at different physical positions inside the vehicle. For example, the sensors can be arranged in the chassis of the car. For example, the sensors can be located on steering knuckles or transverse links in the wheel suspension of the chassis. The sensor can be a physical sensor or a virtual sensor. A physical sensor can be any type of suitable and commonly known sensor, for example an electromechanical acceleration sensor, a microphone or the like. A virtual sensor can be provided for example by application of a suitable model. For example a model of a combustion engine, which receives certain parameters from the engine management system, can provide a signal that rather precisely describes the noise emission of the combustion engine. This particular concept of a virtual sensor can naturally be applied on other components of a vehicle, for example on components of the chassis thereof.

The sensors can be distanced from the quiet zone. The background noise, which is generated in the chassis of the vehicle, has a certain runtime until it reaches the quiet zone and the passenger's ears, respectively. There is a first signal propagation delay of the reference signals, which are for example electric or optical signals, on the path from the sensors to the processing unit. On the other hand, there is a second signal propagation delay of the noise, which is generated by a noise source, for example by a wheel, on a path of similar length from the noise source to the quiet zone. This noise signal, however, is composed of acoustic waves and is transmitted over the ambient air or via the chassis of the vehicle. The first signal propagation delay is typically shorter than the second propagation delay of the background noise. Hence, the reference signal, which is indicative of the background noise, can be analyzed and processed before the background noise itself reaches the passenger area. Due to this, the virtual reference signal can be calculated in advance such that the sound generator, that is driven by a signal that is based on the virtual reference signal, can emit anti-noise that eliminates the background noise, when it reaches the quiet zone.

Together with the design of the combination unit, which can be configured to calculate the virtual reference signal for a future point of time (for example using the Wiener Filter or the neuronal network) a signal for driving the sound generator can be provided that allows very efficient noise cancelation in the quiet zone. The parameters and the particular setup of the controller, such as of the combination unit, such as of the Wiener Filter or the neuronal network, can be determined in calibration measurements.

According to another embodiment, the combination unit can be configured to decorrelate the reference signals in a first step and to determine the virtual reference signal from the decorrelated reference signals in a second step.

The decorrelation of the reference signals does not cause additional signal delay. This is because the decorrelation is merely a linear operation. Furthermore, decorrelation of the reference signals can be utilized when acceleration sensors are applied as reference sensors. The movement of chassis components in a vehicle, for example the movement of steering knuckles or transverse links in the wheel suspension is not independent of each other. This is simply due to the fact, that the parts are physically linked to each other. Hence, the reference signals, which are for example picked up by 3D acceleration sensors, are also not completely independent from each other. It can be expected that at least, some of the acceleration values for the three Cartesian coordinates of each particular sensor will be correlated. By decorrelating the reference signals, the maximum dimension of the signals that have to be processed in the combination unit, can be reduced. This can be performed before substantial processing of the signals starts.

According to an embodiment, the combination unit can implement a Wiener Filter, which can be applied on the reference signals so as to determine the virtual reference signal. According to an alternative embodiment, the combination unit can implement a neuronal network, which can be trained to determine the virtual reference signal from the reference signals. For example, the neuronal network can be a feedforward neuronal network or a recurrent neuronal network.

The Wiener Filter can be a MISO (multiple input single output) FIR (finite impulse response) filter. The filter combines various reference signals to the general virtual reference signal. The filter coefficients of the Wiener MISO FIR Filter, which can be applied to combine the various reference signals to the virtual reference signal, describes the transfer characteristics of the combination unit. The virtual reference signal can be a signal of a virtual monitor microphone, which can be located at the position of the ear of the passenger in the quiet zone. In this approach, the secondary transfer path from the sound generator to the ear of the passenger can be taken into account, because the virtual reference signal is applied for driving the sound generator. However, this approach can be used for determination of the parameters of the Wiener Filter in a calibration procedure. For example, the before mentioned error signal exactly describes the noise that is to be minimized by the noise-canceling algorithm with all signal components and in the entire frequency range—in theory. The frequency range is in practice limited by a band pass, as mentioned before. Furthermore, as also mentioned, this signal output from the sound generator passes through the secondary path on its way from the sound generator to the passenger's ear and has a certain propagation time.

In a situation, in which the error signal is taken as the reference signal, this signal is available to the algorithm too late. The delay is as many clock cycles as the propagation time on the secondary path lasts. To tackle this problem, the virtual reference signal can be predicted. In other words, the reference signal can be determined from the sensor signals for a future point in time. It is possible to predict the signal, due to the fact there is a time difference between the generation of the noise, for example, at the wheels of the vehicle, and the arrival of the background noise in the quiet zone. This prediction can be integrated in the coefficients of the Wiener Filter. This can be performed for example in an initial calibration measurement.

The implementation of a neuronal network in the combination unit can offer more freedom in comparison to the more classical approach using the MISO FIR Wiener Filter. For example, non-linear activation can be used in the neuronal networks to reflect different characteristics in the neurons that simulate non-linear behaviour. Furthermore, different topologies of the neuronal networks can be applied, wherein a feedforward neuronal network and a recurrent neuronal network can be suitable. The training of the neuronal network can be such that the virtual reference signal can be configured to determine the signal for a future point in time. This can be implemented by simply shifting the training signal with respect to the estimated signal or vice versa when training the neuronal network.

As mentioned before, the combination unit can further comprise a band pass unit, which can be configured to apply a band pass filter on the reference signals.

In another embodiment, the noise reduction system can be further enhanced in that the controller comprises at least a first combination unit and a second combination unit. The first combination unit can be coupled to a first set of reference sensors of the plurality of reference sensors. It can be configured to receive the reference signals of the coupled reference sensors. The second combination unit can be coupled to a second set of reference sensors of the plurality of reference sensors and can be configured to receive the reference signals of the coupled reference sensors. The first combination unit can be configured to determine a first virtual reference signal from the reference signals. The second combination unit can be configured to determine a second virtual reference signal from the reference signals. The controller can comprise a first anti-noise unit and a second anti-noise unit. The first combination unit can be coupled to the first anti-noise unit in that the first virtual reference signal can be input to the first anti-noise unit. The second combination unit can be coupled to the second anti-noise unit in that the second virtual reference signal can be input to the second anti-noise unit. The first and the second anti-noise units can be configured to generate the anti-noise signal on a basis of the first and second virtual reference signal.

The first and the second anti-noise units can implement separate adaptive filters. Similarly, the first and the second combination unit can implement different combination algorithms. A first set of sensors can be assigned the first combination unit, a second set of sensors can be assigned the second combination unit. The combination units can be trained independently from each other. This can allow the filter, that is run in the combination unit, for example a Wiener filter or a neuronal network, to be tailored on the particular sensors. The performance of the system can be enhanced. Furthermore, according to another embodiment, the signals that are processed by the different combination units, can be filtered, such as band pass filtered. This can allow for implementation of for example a sub band approach. This means that one of the combination units can compensate for background noise in a selected sub band of the background noise.

The above embodiments refer to feedforward active noise reduction systems. Further designs of active noise canceling systems can implement the so-called concept of virtual microphones. In this design, the physical error microphone can be replaced by a monitor microphone array in combination with a virtual sensing algorithm that can be run on the controller. Hence, the error microphone can become a virtual error microphone. This concept can be combined with the above referred concept of combinatorial analysis of reference signals.

Hence, according to an embodiment the error microphone of the noise reduction system can be a virtual error microphone implementing a monitor microphone array having a plurality of monitor microphones and a virtual sensing algorithm implemented in the controller. Thereby, the controller can be configured to estimate an error signal at a position of a virtual microphone. The virtual microphone can be located in the noise reduction area and the error signal can be indicative of a difference between the background noise and the anti-noise at the position of the virtual microphone. The controller can further comprise a dynamic adjustment unit, which can be configured to update parameters of the anti-noise unit based on the error signal and so as to minimize the error signal.

In noise reduction systems, efficient suppression of the background noise is typically achieved in a small spatial region only. The spatial region, which is referred to as the quiet zone, lies inside the noise reduction area. In the quiet zone, the anti-noise is superimposed with the background noise in more or less phase opposition and therefore efficient suppression of the background noise occurs. However, it is sometimes desirable to increase the quiet zone, because there is a risk that the passenger's ear leaves the quiet zone or the optimal point for noise reduction inside this quiet zone upon small head movements. To increase the spatial expansion of the quiet zone, the noise reduction systems can be configured according to the following embodiments:

According to an embodiment, the noise reduction system can be further enhanced in that a plurality of positions can be located in the noise reduction area and the controller can be configured to estimate at least a first error signal for a virtual microphone located at a first position and a second error signal for a virtual microphone located at a second position and the controller comprises an averaging unit that is configured to calculate an average error signal from at least the first and the second error signal and the dynamic adjustment unit can be configured to update the parameters of the anti-noise unit based on the average error signal and so as to minimize the average error signal.

By averaging of the error signals, wherein an average of two or more virtual microphones can be taken into account, the quiet zone can be spatially increased. At the same time, it can be avoided that the computational load on the processing unit significantly increases, since the system still uses only one single virtual microphone signal.

The virtual microphones in the noise reduction area can be arranged in a grid or the position of the virtual microphones can be freely selected and defined. The virtual microphones can be dynamically rearranged, which means that their positions can be changed or optimized during operation of the system. For example, there is multiplicity of predetermined positions, at which the virtual microphones can be placed.

In another embodiment the averaging unit can be further configured to calculate the average error signal, which can be an arithmetic average of the at least first and second error signal. Furthermore, the noise reduction system can be enhanced in that the averaging unit can be further configured to calculate the average error signal, which is a weighted average of the at least first and second error signal.

The selection of a variable point for the virtual microphone can be supported by position detection of a passenger in the passenger transport area of the vehicle. According to a corresponding embodiment, the noise reduction system can be further enhanced by a position detection unit configured to detect a position and/or orientation of a head and to estimate a position of an ear of a user in the passenger transport area, wherein the controller can be further configured to select a main position of the plurality of positions, which can be adjacent to the estimated position of the ear of the user, wherein the averaging unit can be configured to overweight the error signal at the main position when calculating the average error signal.

The noise reduction system according to a further embodiment can have a controller, which can comprise: a first filter unit configured to receive the anti-noise signal and to estimate a shifted anti-noise signal, which can be indicative of the anti-noise at a physical position of one of the monitor microphones of the monitor microphone array, a first arithmetic unit configured to receive the shifted anti-noise signal and a monitor signal of the monitor microphone being located at said physical position, wherein the first arithmetic unit can be configured to calculate a residual signal, which is a difference between the monitor signal and the shifted anti-noise signal at the physical position of the monitor microphone, a second filter unit, which can be configured to receive the residual signal and to estimate a shifted residual signal, which is the residual signal shifted to the position of the virtual microphone, a third filter unit configured to receive the anti-noise signal and to estimate a shifted anti-noise signal, which can be indicative of the anti-noise at the position of the virtual microphone, a second arithmetic unit configured to receive the shifted residual signal and the shifted anti-noise signal and to estimate the error signal for the position of the virtual microphone by addition of the shifted residual signal and the shifted anti-noise signal.

The noise reduction system can feature a decorrelation of the reference signals for dimensional reduction and subsequent linear filtering using a Wiener Filter or processing in a neuronal network to generate the virtual reference signal. With respect to the decorrelation, signals can be picked up by acceleration sensors placed in the chassis of the vehicle. The Wiener Filter and the neuronal network can be adapted and trained, respectively, to generate a virtual reference signal for a future point in time. The system can be supplemented by an enhanced concept of virtual microphones, for which average error signals can be determined.

Such object can be further solved by a method of operating a noise reduction system for actively compensating background noise generated by a noise source in a noise reduction area in a passenger transport area of a vehicle, the system comprising a controller comprising hardware, at least one reference sensor, which detects the background noise of the noise source, a sound generator, which generates anti-noise for superimposing the anti-noise with the background noise in the noise reduction area for active reduction of the background noise, and an error microphone picking up background noise emitted by the noise source and anti-noise emitted by the sound generator, wherein a noise canceling algorithm is implemented in the controller comprising an anti-noise unit, which generates an anti-noise signal for driving the sound generator in that it generates the anti-noise, wherein the method can be further enhanced in that the system can comprise a plurality of reference sensors, which detect the background noise of the noise source, the reference sensors being arranged at different positions in the vehicle, wherein every reference sensor generates a reference signal, the controller can further comprise at least one combination unit, said combination unit can be coupled to at least two of the plurality of reference sensors and receives the reference signals of the coupled reference sensors, wherein the combination unit can further determine a virtual reference signal from the reference signals and the combination unit can be coupled to the anti-noise unit in that the combination unit inputs the virtual reference signal to the anti-noise unit, which generates the anti-noise signal on a basis of the virtual reference signal.

With respect to the method of operating the noise reduction systems, same or similar advantages, which have been mentioned with respect to the noise reduction system apply in a same or similar way. Furthermore, the method can be enhanced by options and features, which have been mentioned with respect to the noise reduction system.

In an embodiment, the combination unit can determine the virtual reference signal from the reference signals for a future point in time.

Furthermore, according to another embodiment, the combination unit can de-correlate the reference signals in a first step and determine the virtual reference signal from the de-correlated reference signals in a second step.

The method can be further enhanced in that the combination unit can apply a Wiener Filter on the reference signals to determine the virtual reference signal.

In an alternative embodiment, the combination unit can implement a neuronal network, and input the reference signals in the neuronal network to determine the virtual reference signal.

Furthermore, the method can be enhanced by the combination unit further comprising a band pass unit, which applies a band pass filter on at least one of the reference signals.

Also the method can be enhanced by the concept of more than one combination unit. Hence, according to an another embodiment the controller can comprise at least a first combination unit and a second combination unit. The first combination unit can be coupled to a first set of reference sensors of the plurality of reference sensors and receives the reference signals of the coupled reference sensors. The second combination unit can be coupled to a second set of reference sensors of the plurality of reference sensors and receives the reference signals of the coupled reference sensors. The first combination unit can determine a first virtual reference signal from the reference signals. The second combination unit can determine a second virtual reference signal from the reference signals. The controller can comprise a first anti-noise unit and a second anti-noise unit. The first combination unit can be coupled to the first anti-noise unit and the first virtual reference signal can input to the first anti-noise unit. The second combination unit can be coupled to the second anti-noise unit and the second virtual reference signal can input to the second anti-noise unit. The first and the second anti-noise units can generate the anti-noise signal on a basis of the first and second virtual reference signal.

The concept of virtual microphones can also be applied on the method. Hence, there is an embodiment according to which the error microphone of the system can be a virtual error microphone implementing a monitor microphone array having a plurality of monitor microphones and a virtual sensing algorithm that can be implemented on the controller in that the controller can estimate an error signal at a position of a virtual microphone. The virtual microphone can be located in the noise reduction area and the error signal can be indicative of a difference between the background noise and the anti-noise at the position of the virtual microphone. The controller can further comprise a dynamic adjustment unit, which can update parameters of the anti-noise unit based on the error signal and so as to minimize the error signal.

Also the method can also be enhanced by the concept of a plurality of virtual microphones, which has been outlined with respect to the noise reduction system in detail above. Details and characteristics of the noise reduction system apply on the method in a same or similar way.

Finally, such object can be solved by the use of a noise reduction system for actively compensating background noise generated by a noise source in a noise reduction area in a passenger transport area of a vehicle, such as in a commercial vehicle, or in a construction vehicle.

BRIEF DESCRIPTION OF THE DRAWINGS

Further characteristics of the embodiments will become apparent from the description of the embodiments together with the claims and the included drawings. Embodiments can fulfill individual characteristics or a combination of several characteristics.

The embodiments are described below, without restricting the general intent of the invention, based on exemplary embodiments, wherein reference is made expressly to the drawings with regard to the disclosure of all details that are not explained in greater detail in the text. In the drawings.

In the drawings, the same or similar types of elements or respectively corresponding parts are provided with the same reference numbers in order to prevent the item from needing to be reintroduced.

DETAILED DESCRIPTION

Figure 1:
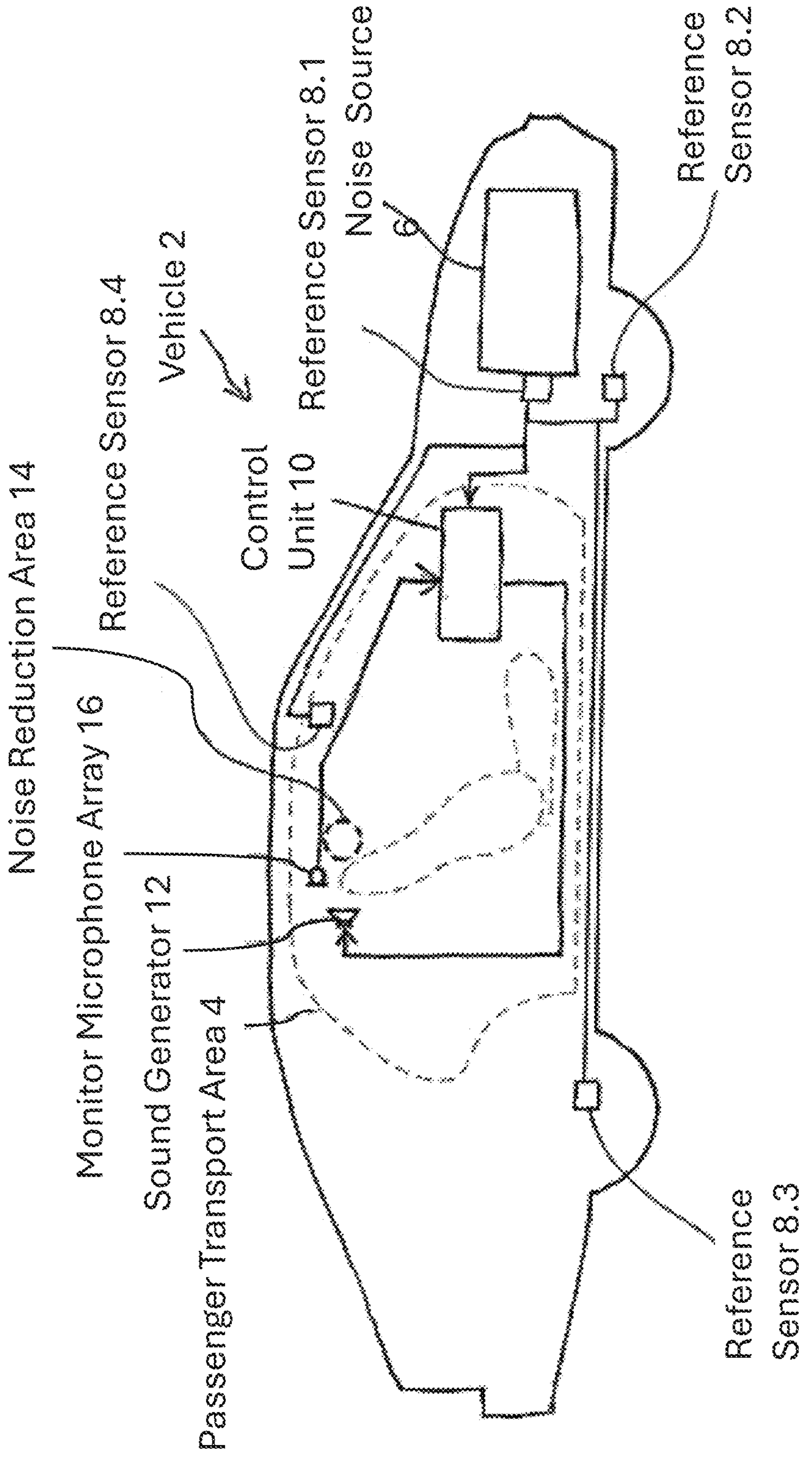
FIG. 1 illustrates a simplified schematic drawing illustrating a vehicle comprising a noise reduction system.

FIG. 1 is a simplified schematic drawing of a vehicle 2, which can be a passenger car, a commercial vehicle, a construction vehicle or any other road driven vehicle. The vehicle 2 comprises a passenger transport area 4, which is illustrated in dashed line. The vehicle 2 is equipped with a noise reduction system for actively compensating background noise, which is generated by a noise source 6. The noise source 6 can be the engine of the vehicle 2 or any other device or source which generates undesired background noise. For example, the noise source 6 can be a wheel, an auxiliary drive or a mechanic or hydraulic system of the vehicle 2. Furthermore, the noise source 6 can be a part or component of the chassis of the vehicle 2. The background noise, which is to be reduced in the passenger transport area 4 is measured by a plurality of reference sensors 8.1, 8.2, 8.3 and 8.4, which are commonly referred to as reference sensors or generally sensors 8. For example, the first sensor 8.1 is a microphone or an acceleration sensor, which is located near to the vehicle's engine. The second and the third sensors 8.2 and 8.3 are for example acceleration sensors which are located in the vehicle's chassis, for example on the wheel suspension. Further, by way of an example only, the fourth sensor 8.4 is a microphone that is located in the passenger transport area 4 and which is configured to detect vibrations and movements of the vehicle's chassis in an upper part thereof. According to further embodiments, additional sensors 8 can be placed at arbitrary positions in the vehicle 2.

The sensors 8 can be any device suitable for detecting the background noise of the noise source 6. It can be microphones or acceleration sensors, for example. The sensor 8 is not limited to an electro acoustical or electromechanical device like a microphone. It is also possible to input a signal related to the background noise source 6 to a model, which outputs a computed background noise signal. For example, a number of revolutions of an engine or any other suitable parameter thereof can be input to the model of the engine or can be directly input to the noise-canceling system. In other words, parameters of the noise source 6, which are electronically available, can be directly used for estimation of the background noise.

The noise reduction system of the vehicle 2 comprises a control unit (such as a processor/controller comprising hardware) 10, which can be a separate electronic device. The control unit 10, however, can also be implemented as software in a main controller of the vehicle 2, which, in this case, provides the control unit 10. The noise reduction system further comprises a sound generator 12 for generating anti-noise. The sound generator 12 can be a loudspeaker or any other actuator. The anti-noise and the background noise are superimposed in a noise reduction area 14 for active reduction of the background noise. Furthermore, the noise reduction system comprises at least one monitor microphone 15, such as a monitor microphone array 16 comprising a plurality of monitor microphones 15, which is disposed adjacent to the noise reduction area 14. The monitor microphone array 16 is configured to pick up background noise emitted by the noise source 6 and anti-noise emitted by the sound generator 12.

Figure 2:
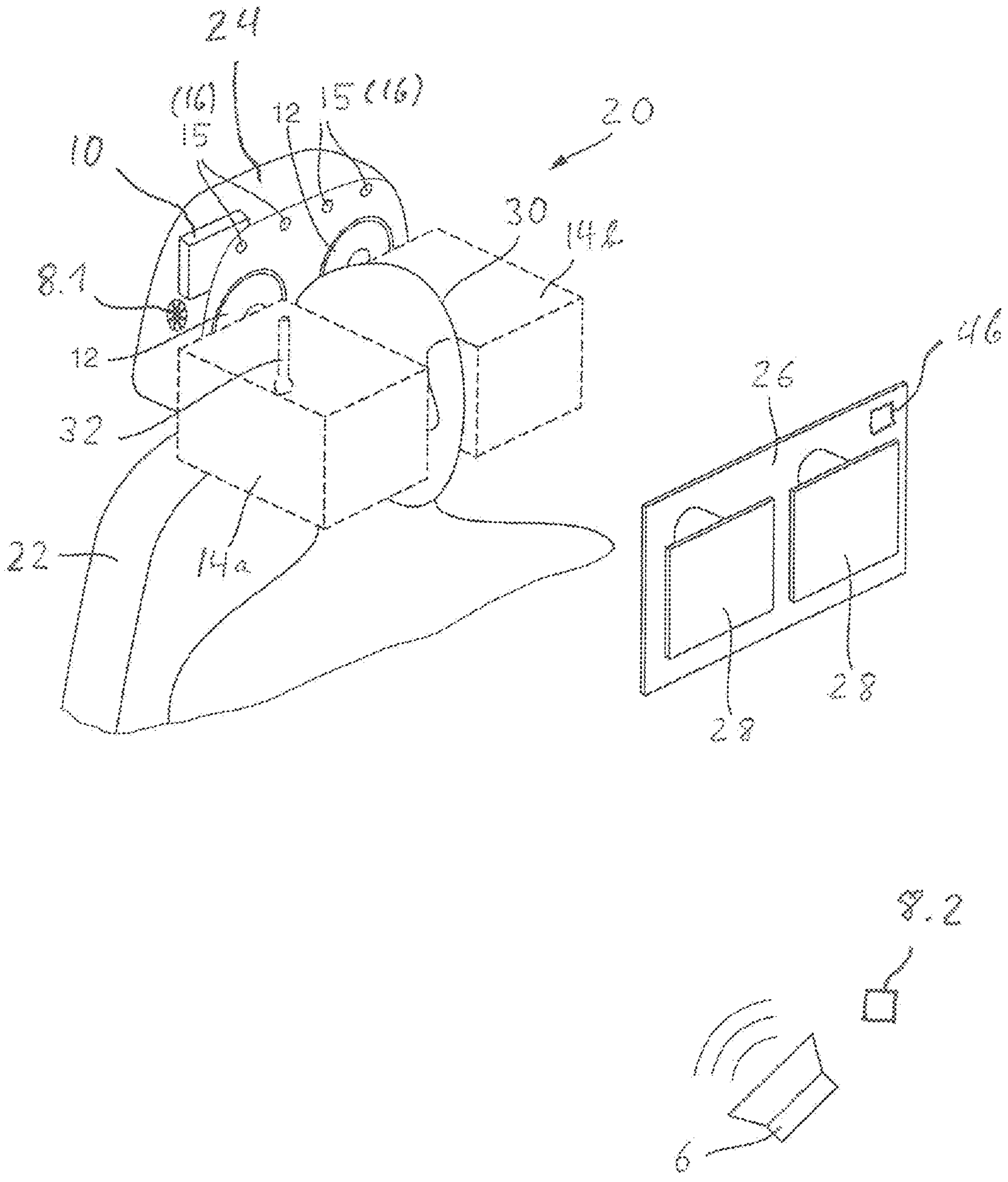
FIG. 2 illustrates a simplified schematic illustration of a noise reduction system.

FIG. 2 shows a simplified schematic illustration of the noise reduction system 20, which can be integrated in the vehicle 2 shown in FIG. 1. By way of an example, the main parts of the system are arranged in a driver's seat 22, such as in a headrest 24 of the seat 22.

There is the control unit 10, the monitor microphone array 16 and the sound generator 12. Furthermore, the sensors 8, for example a microphone, can be arranged in the headrest 24 for detecting the background noise of the noise source 6 (schematically represented by a loudspeaker). The sensors 8, however, can be arranged remote from the remaining parts of the system 20 as it is for example illustrated in FIG. 1. The noise reduction system 20 in FIG. 2 is a compact system, which can be completely implemented in one single unit, by way of an example in the headrest 24. In a more distributed system, it is also possible that the noise-canceling system 20 uses existing sensors, which are already present in the vehicle 2 and are also used by other systems of the vehicle 2, for example by an audio system. The noise reduction system 20 is a feed forward system which applies reference sensors 8. Furthermore, the noise reduction system 20 comprises a sound generator 12, which is for example a loudspeaker. The sound generator 12 is also located in the headrest 24 by way of an example only.

The noise reduction system 20 further comprises a head tracking system 26, which comprises for example a pair of stereo cameras 28. The head tracking system 26 is applied for detecting a position and/or orientation of the head 30 of a passenger, who is situated in the passenger transport area 4. The head tracking system 26 is suitable for detecting the position of an ear of the user or passenger, such as the location of the entrance of the auditory channel. The head tracking system 26 can also be integrated in the headrest 24 so as to provide an integrated system. The position of the user's head 30 is detected or computed by the position detection unit 46 of the head tracking system 26.

The head tracking is suitable for establishing the noise reduction area 14 in that it is directly adjacent to the passenger's head 30, i.e. near to the passenger's ears. When making reference to a noise reduction area 14, it should be noted that there is a right noise reduction area **14*b* and a left noise reduction area 14*a*, which are established so as to provide a suitable noise reduction for both ears of the user. By way of an example and without limitation, for the purpose of simplification of explanations only, reference will be made to a noise reduction area 14 in the following. Notwithstanding the explanations are made for a single noise reduction area 14, the noise reduction system 20 is suitable for establishing two or even more noise reduction areas 14** for at least both ears of a passenger or even for a plurality of passengers.

The noise canceling system 20 can implement any suitable noise canceling algorithm. This is implemented in the control unit 10. For example on one or more of the following filters or algorithms is suitable: FxLMS (filtered at least main square), FsLMS (filtered-s least main square), a neuronal network, a statistic FIR-filter (finite impulse response) or the like.

In an attempt to establish the noise reduction area 14 at the most suitable position for efficient noise reduction, the noise reduction system 20 can apply the concept of virtual microphones 32. The virtual microphone 32 is established in the noise reduction area 14. At a position of the virtual microphone 32, an error function is detected, which is the residual noise at the position of the virtual microphone 32 after noise cancelation. By minimizing the error function at the position of the virtual microphone 32, the noise reduction system 20 optimizes noise-canceling performance. This is why it is desirable to place the virtual microphone 32 as near to the entrance of the auditory channel of the passenger's head 30 as possible. This can be performed by for example relocating the position of the virtual microphone 32 based on data generated by the head tracking system 26.

According to such an embodiment, the control unit 10 runs a virtual sensing algorithm which is commonly referred to as the "remote microphone technique". Without prejudice, reference will be made to this type of algorithm in the following. According to further embodiments, alternative algorithms can be run on the control unit 10. These are for example algorithms referred to as: "virtual microphone arrangement", "forward difference prediction technique", "adaptive LMS virtual microphone technique", "Kalman filtering virtual sensing" or "stochastically optimal tonal diffuse field virtual sensing technique".

Figure 3:
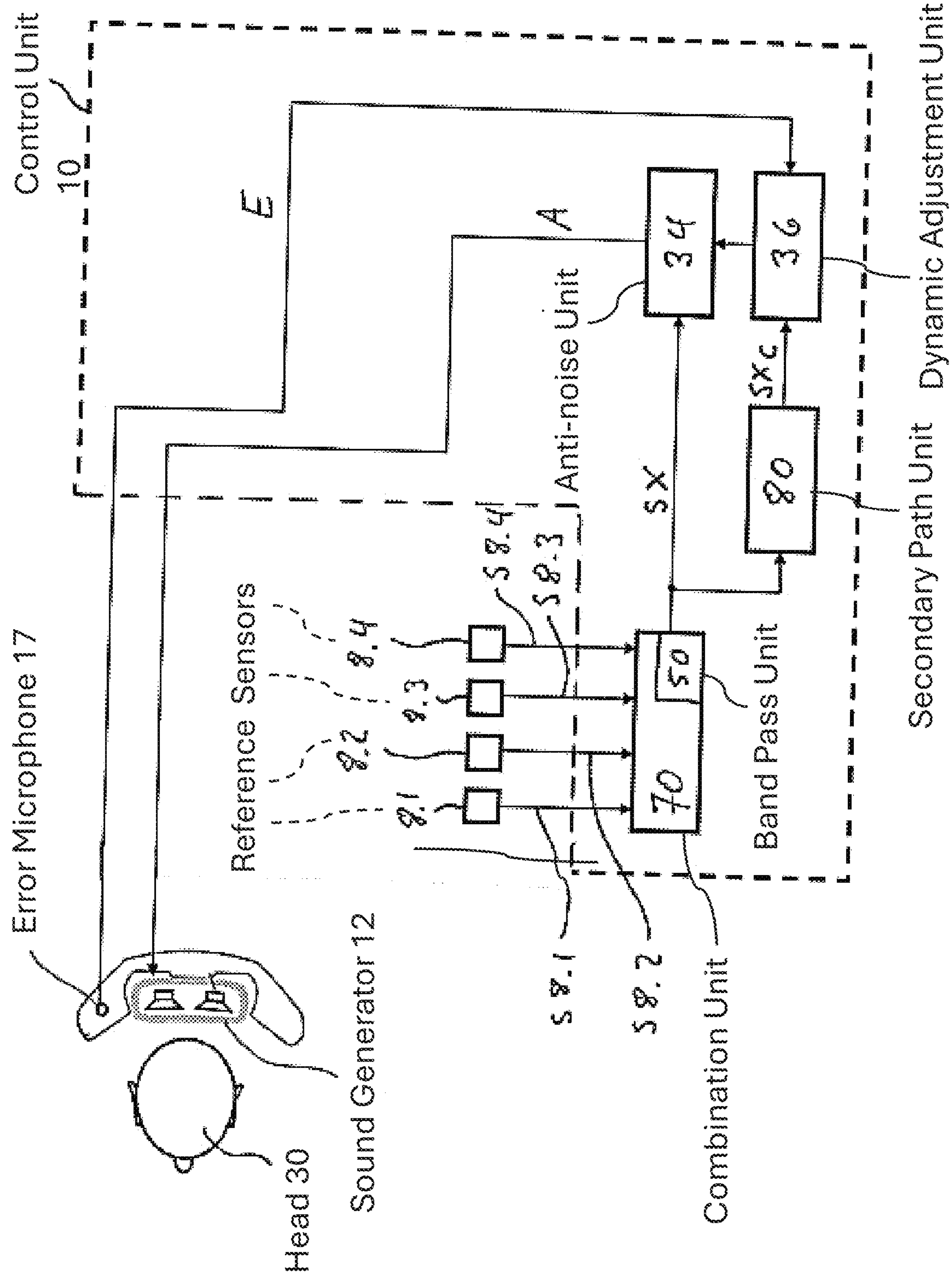
FIGS. 3 to 6 illustrate the functionality of a noise reduction system according to embodiments.
Figure 4:
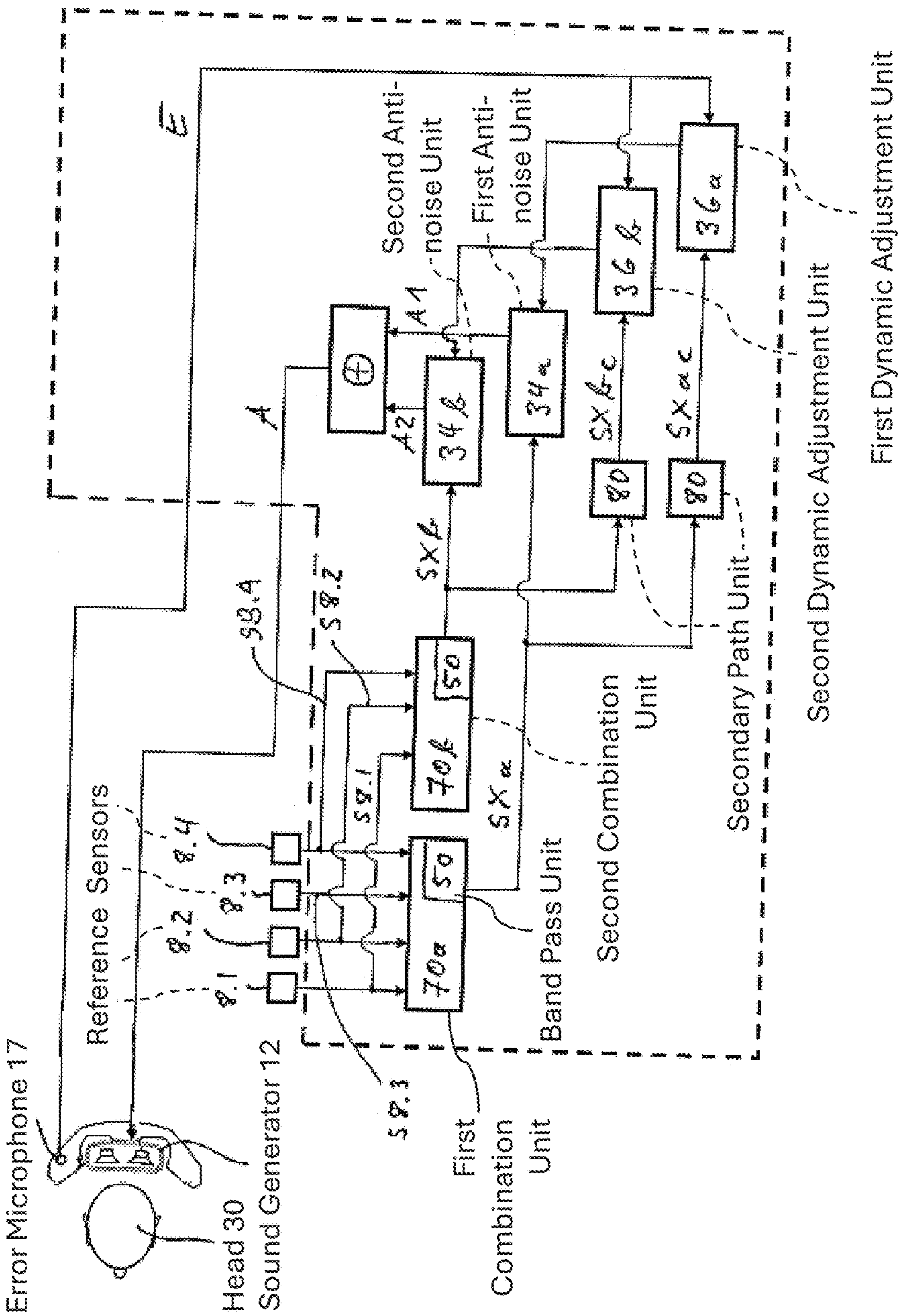

FIGS. 3 and 4 illustrate an embodiments of a noise reduction system, such as of the control unit 10. The embodiments feature a feed forward noise reduction system that dispenses with the concept of virtual microphones. Noise reduction systems featuring the concept of virtual microphones will be explained with reference to FIGS. 5 and 6.

The control unit 10 in FIG. 3 is configured as comprising a combination unit 70, that is coupled to a plurality of reference sensors 8.1, 8.2, 8.3 and 8.4. The combination unit 70 generates the virtual reference signal SX. The combination unit 70 can further implement a band pass unit 50. The band pass unit 50 is configured to apply a band pass filter on at least one of the signals S8.1 . . . S8.4. The virtual reference signal SX is input to the anti-noise unit 34 and to the secondary path unit 80, each also provided in the control unit 10. The secondary path unit 80 is optional. In other words, according to another embodiment, the control unit 10 is implemented without the secondary path unit 80 and the signal transmission lines associated therewith.

The secondary path unit 80 features a model simulating a secondary path of the anti-noise signal A from an output of the anti-noise unit 34 to the reference microphone 17. This typically includes a signal path via an amplifier (not depicted), the sound generator 12 and a sound transmission path over the air, from the sound generator 12 to the error microphone 17. The secondary path unit 80 outputs a corrected virtual reference signal SXc, which is input to a dynamic adjustment unit 36. The dynamic adjustment unit 36 is coupled to the anti-noise unit 34, which generates the anti-noise signal A. The anti-noise unit 34 implements an arbitrary suitable noise canceling algorithm. For example, the anti-noise unit 34 implements an FIR-filter (finite impulse response) or a neuronal network.

The dynamic adjustment unit 36, also provided in the control unit 10, in addition to the corrected virtual reference signal SXc, receives the error signal E from the error microphone 17. Based on the corrected virtual reference signal SXc and the error signal E, the dynamic adjustment unit 36 updates the parameters of the anti-noise unit 34, for example the parameters of one of the above mentioned noise canceling algorithms. This is typically performed with the goal to minimize a difference between the corrected virtual reference signal SXc and the error signal E. By way of an example, the dynamic adjustment unit 36 implements a LMS-algorithm for this purpose. Hence, the anti-noise unit 34 dynamically generates the anti-noise signal A that is input to the sound generator 12 for generation of anti-noise to compensate the background noise in the passenger transport area 4.

The anti-noise unit 34 and the dynamic adjustment unit 36 can be considered a single functional unit. In this respect, the units can implement for example a FxLMS (filtered at least main square) or FsLMS (filtered-s least main square) algorithm.

FIG. 4 illustrates a further embodiment of a noise reduction system, with regard to the control unit 10. The design of the system is similar to that, which was already explained with reference to FIG. 3. The system implements a control unit 10, which applies a feed forward noise canceling algorithm. Unlike the system that was explained with reference to FIG. 3, the system in FIG. 4 comprises a first combination unit 70*a* and a second combination unit 70*b*. The combination units 70*a*, 70*b* are coupled to the plurality of reference sensors 8.1 . . . 8.4. However, not all reference sensors 8 have to be coupled to both of the combination units 70*a*, 70*b*. By way of an example only, all reference sensors 8.1 . . . 8.4 are coupled to the first combination unit 70*a*. Furthermore, by way of an example only, three of the reference sensors 8, namely sensors 8.1, 8.2 and 8.4 are coupled to the second combination unit 70*b*. Hence, the sensors 8 are grouped in two sets of sensors and the respective reference signals S8.1 . . . S8.4 are separately analyzed and combined in the first and second combination unit 70*a*, 70*b*, respectively. Based on the received reference signals S8, the combination units 70*a*, 70*b* generate a respective one of the first virtual reference signal SXa and the second virtual reference signal SXb. The design and implementation of a plurality of combination units 70 can be utilized because the first and second combination unit 70*a*, 70*b* can be tailored to their specific task, i.e. to the combination of the assigned reference signals S8. For example, if the combination units 70*a*, 70*b* are implemented as neuronal networks, these can be trained for their particular task. The second combination unit 70*b* can be implemented by way of a Wiener filter or as a neuronal network, these can be optimized or trained to analyze the signals S8.1, S8.2 and S8.4 of the sensors 8.1, 8.2 and 8.4. Specific characteristics of the sensors 8 and their respective signals S8 can be taken into account during the training or definition of the parameters. Furthermore, the combination units 70*a*, 70*b* can implement a band pass unit 50, which is configured to apply a band pass filter on at least one of the signals S8.1 . . . S8.4.

The band pass unit 50 can filter at least one of the signals S8.1 . . . S8.4, which are input to a respective one of the combination units 70*a*, 70*b*. Filtering of the signals, for example a band pass filtering in the frequency domain, can be performed for example in view of a band pass analysis, which can be performed by one or more of the combination units is 70*a*, 70*b*. Hence, the second combination unit 70*b* can for example analyze a sub frequency band of the signals S8 of the reference sensors 8, which are assigned to this unit. A particular optimization or training of the algorithm that is implemented in the combination units 70*a*, 70*b* can be performed and by this, the combination units 70*a*, 70*b* can be tailored to their specific task, for example the analysis of a certain sub-band of the received signals.

The combination units 70*a*, 70*b* output the first and second virtual reference signal SXa, SXb, respectively. Similar to the embodiment which was explained with reference to FIG. 3, these signals are input to a first and a second anti-noise unit 34*a*, 34*b*, respectively. In addition to this, the first and second virtual reference signal SXa, SXb are input to a secondary path unit 80. By way of an example only, the system comprises a separate secondary path unit 80 for a respective one of the first and second virtual reference signals SXa, SXb. This separate implementation reflects different secondary paths. It is also possible to filter the first and second reference signal SXa, SXb using a single secondary path unit 80.

The corrected signals SXac, SXbc are input to the first and second dynamic adjustment unit 36*a*, 36*b*. In the depicted embodiment, the corrected first virtual reference signal SXac is input in the first dynamic adjustment unit 36*a*. The corrected second virtual reference signal SXbc is input to the second dynamic adjustment unit 36*b*. The first and second dynamic adjustment unit for example implement dynamic filters that are configured to update parameters of a respective one of the first and second anti-noise units 34*a*, 34*b*. The two anti-noise units 34*a*, 34*b* each output an anti-noise signal, namely a first anti-noise signal A1 and a second anti-noise signal A2, respectively. The first and second anti-noise signal A1, A2 are input to a summing unit 82 that is configured to calculate an average from the two anti-noise signals A1, A2 and outputs the anti-noise signal A. The anti-noise signal A is than input to the sound generator 12. The remaining parts and units of the embodiment including their functions was already explained with reference to FIG. 3.

Figure 5:
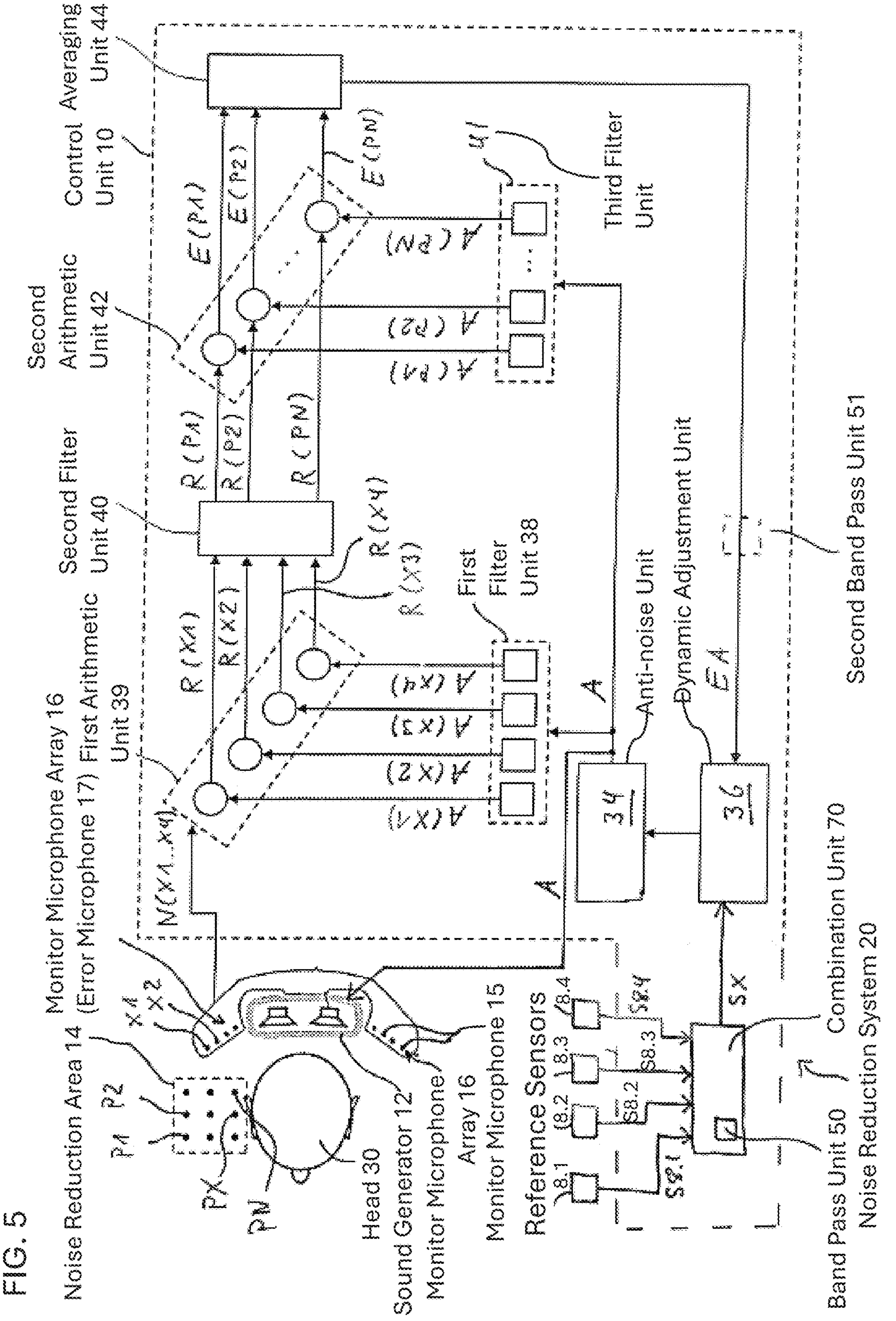

FIG. 5 is a drawing illustrating a noise reduction system 20, which applies a virtual sensing algorithm, according to an embodiment. The system 20 comprises a plurality of sensors 8.1, 8.2, 8.3 and 8.4 for detecting the background noise of the noise source 6. The particular location and arrangement of the sensors 8 has been explained with reference to FIG. 1.

Every sensor 8.1 . . . 8.4 is configured to generate a reference signal S8.1 . . . S8.4. The control unit 10 comprises a combination unit 70, which is coupled to the sensors 8.1 . . . 8.4 and configured to receive the respective reference signals S8.1 . . . S8.4. From the reference signals S8.1 . . . S8.4, which are commonly referred to as reference signal S8, the combination unit 70 determines the virtual reference signal SX. Furthermore, the combination unit 70 is coupled to the dynamic adjustment unit 36 in that the virtual reference signal SX is input to the dynamic adjustment unit 36. The dynamic adjustment unit 36 updates parameters of the anti-noise unit 34, which is thereby configured to generate the anti-noise signal A on the basis of the virtual reference signal SX.

The combination unit 70 can be configured to determine the virtual reference signal SX from the reference signals S8.1 . . . S8.4 for a future point in time. Furthermore, the combination unit is 70 is configured to decorrelate the reference signals S8.1 . . . S8.4 in a first step and to determine the virtual reference signal SX from the decorrelated reference signals S8.1 . . . S8.4 in a subsequent and second step. For performance of the signal processing, the combination unit 70 implements a Wiener Filter, for example. The Wiener Filter is applied on the reference signals S8 so as to determine the virtual reference signal SX. In an alternative embodiment, the combination unit 70 implements a neural network, which is trained to determine the virtual reference signal SX from the reference signals S8. The neuronal network can be a feed forward neuronal network or a recurrent neuronal network.

The combination unit 70 can further implement a band pass unit 50, which is configured to apply a band pass filter on at least one of the reference signals S8. The band pass unit 50 is optional.

The background noise is converted to the virtual reference signal SX, which is input to the dynamic adjustment unit 36. The dynamic adjustment unit 36 is configured to update parameters of the anti-noise unit 34, which is configured to generate the anti-noise signal A. The anti-noise signal A is for driving the sound generator 12 in that it emits the anti-noise for superposition with the background noise of the noise source 6 (see FIGS. 1 and 2) in the noise reduction area 14.

The dynamic adjustment unit 36 is for updating parameters of the anti-noise filter unit 34 based on an average error signal EA and the virtual reference signal SX and so as to minimize the average error signal EA in an attempt to optimize the noise-canceling effect.

The noise reduction system 20 furthermore comprises the microphone array 16, which comprises a plurality of monitor microphones 15, each illustrated using a dot. The error microphone 15 is implemented as a virtual error microphone. This virtual error microphone comprises the microphone array 16 together with a virtual sensing algorithm, according to this embodiment. The array 16 is configured to pick up background noise and anti-noise for a plurality of virtual microphone positions P1, P2 . . . PN. The virtual microphone positions are referred to as P1, P2 . . . PN for an arbitrary number of N of virtual microphones. The virtual microphone positions are generally referred to as P. They are located in the noise reduction area 14 and they can be arranged in a grid, by way of an example only.

A maximum distance between the positions P actually depends on the frequency range in which the noise-canceling algorithm operates. This frequency range can be between 50 Hz and 600 Hz. The upper limit or cutoff frequency is chosen in that a prefix of the anti-noise signal does not invert within the noise reduction area 14. This prerequisite can be utilized for the stability of the noise-canceling algorithm. When calculating a spatial distance from this frequency, this results in a maximum spatial distance of about 0.2 m. This limit should be a maximum distance for the points P, at which the virtual microphones are arranged.

The frequency range can be set by integrating a second band pass unit 51 in the signal line of the average error signal EA. As indicated by the dashed line, this is an optional unit. As already mentioned before, the combination unit 70 can feature a band pass unit 50.

In the embodiment of FIG. 5, the control unit 10, which comprises the anti-noise unit 34, the dynamic adjustment unit 36 and the combination unit 70, further comprises an averaging unit 44, which is configured to calculate the average error signal EA. The average error signal EA is indicative of a difference between the background noise and the anti-noise at more than one position P in the noise reduction area 14. By taking into account the error signal E(P1), E(P2) . . . E(PN) for more than a single position of a virtual microphone, the noise reduction area 14 can be spatially increased. The dynamic adjustment unit 36 updates the parameters of the noise-canceling algorithm running in the anti-noise unit 34 based on and so as to minimize the average error signal EA.

The estimation of the average error signal EA reflects more than one position P in the noise reduction area 14. It can be either performed by calculating more than one error signal or by calculating an average error signal EA, which is indicative of a difference between the background noise and the anti-noise in a predetermined section PQ of the noise reduction area 14, wherein the section PQ comprises more than one position P. The first concept will be explained in the following by making reference to FIG. 5, the second concept will be explained by making reference to FIG. 6. Naturally, multiple embodiments of each respective concept are explained when making reference to the figures.

In FIG. 5, the control unit 10 further comprises a first filter unit 38, which is configured to receive the anti-noise signal A. The first filter unit 38 estimates a shifted anti-noise signal, generally referred to as A(x), which is indicative of the anti-noise at the physical position x of one of the monitor microphones 15 of the microphone array 16. By way of an example, the physical positions of the monitor microphones 15 are denoted x1 . . . x4 (only some of the physical positions are given reference numerals). The corresponding shifted anti-noise signals for these positions x1 . . . x4 are A(x1), A(x2), A(x3) and A(x4). The shifted anti-noise signal A(x) represents the estimated anti-noise signal at the respective physical position of the monitor microphones 15. For the calculation of the individual signals A(x1), A(x2), A(x3) and A(x4), the first filter unit 38 can comprise respective sub-units.

Furthermore, the control unit 10 comprises a first arithmetic unit 39. The first arithmetic unit 39 receives the shifted anti-noise signals A(x) and a monitor signal, generally referred to as N(X), of the monitor microphones 15 being located at the physical position x. The first arithmetic unit 39 can receive the shifted anti-noise signals A(x1), A(x2), A(x3) and A(x4) and the monitor signal N(x1 . . . x4) of the monitor microphones 15 being located at positions x1 . . . x4. The first arithmetic unit 39 is configured to calculate a residual signal, which is generally denoted R(x) and which is a difference between the monitor signal N(x) and the shifted anti-noise signal A(x) at the physical position x of the monitor microphone 15. The first arithmetic unit 39 can calculate the residual signals R(x1), R(x2), R(x3) and R(x4), which is a respective difference between A(x1) and N(x1), A(x2) and N(x2), A(x3) and N(x3) and A(x4) and N(x4). The residual signal R(x) is the residual noise at the respective position x of the monitor microphone 15, which means the noise generated by the noise source 6 minus the anti-noise signal at a respective position x.

The residual signals R(x) are input to a second filter unit 40. The second filter unit 40 is configured to estimate a shifted residual signal R(P), which is the residual signal R(x) shifted to the position P of the virtual microphone. Residual signals R(P1) . . . R(PN) for a respective one of the position P1 . . . PN, such as for all the positions P in the noise reduction area 14, can be calculated.

The control unit 10 further comprises a third filter unit 41, which receives the anti-noise signal A. The third filter unit 41 is configured to estimate a shifted anti-noise signal, which is generally denoted A(P) and which is indicative of the anti-noise at the position P of the virtual microphone 32. For calculation of a respective one of the shifted anti-noise signals A(P1) . . . A(PN), the third filter unit 41 can comprise respective subunits.

Furthermore, the control unit 10 comprises a second arithmetic unit 42, which receives the residual signals R(P) and the shifted anti-noise signals A(P), respectively. The second arithmetic unit 42 can receive the shifted residual signals R(P1) . . . R(PN) and the shifted anti-noise signals A(P1) . . . A(PN) for a respective one of the positions P1 . . . PN in the noise reduction area 14. The second arithmetic unit 42, from a respective one of these pairs of values, calculates or estimates an error signal, which should be generally denoted E(P), for the position P of the virtual microphone. A first error signal E(P1) can be calculated for a point P1, a second error signal E(P2) is calculated for a point P2, wherein this is continued up to the maximum number N of points P in the noise reduction area 14, which means the error signal E(PN).

All the error signals E(P1) . . . E(PN) are input to the averaging unit 44. From the error signals E(P), the averaging unit 44 calculates the average error signal EA. The average error signal EA can be the arithmetic average of all the previously mentioned error signals E(P1), E(P2) . . . E(PN). This averaging is performed at least for the first and the second position P1, P2 of the virtual microphones. The averaging unit 44 can be configured to compute the average error signal EA, which is the average of every error signals E(P1), E(P2) . . . E(PN) for all positions P1, P2 . . . PN of the virtual microphones located in the noise reduction area 14. The average error signal EA is input to the dynamic adjustment unit 36 to update parameters of the anti-noise filter unit 34, which means the updated parameters are calculated based on information about the average error signal EA and so as to minimize the average error signal EA. This leads to the effect of minimization of background noise generated by the noise source 6 in the noise reduction area 14.

The averaging unit 44 can be configured to calculate the average error signal EA from an arithmetic average of the individual error signals E(P1), E(P2) . . . E(PN). According to another embodiment, the averaging unit 44 of the noise reduction system 20 is configured to calculate the average error signal EA as a weighted average. This can be performed by giving one or more of the error signals E(P1), E(P2) . . . E(PN) an individual weight or weighting factor. When calculating this weighted average, particular emphasis can be put on a certain point P, at which a main virtual microphone is located. For example, if the head 30 of the passenger is in the position illustrated in FIG. 5, the point PX is located nearest to the ear of the passenger. Consequently, the best performance of the noise reduction should be at this particular point PX. Hence, an overweight can be placed on the error function E(PX) for the point PX and the corresponding virtual microphone. This can be performed by for example giving the error function a higher weighting factor than the remaining error functions of the other points P.

The location of the point PX, which is located nearest to the user's ear, can be performed by for example the head tracking system 26. For this purpose, the head tracking system 26 (see FIG. 2) comprises not only the camera arrangement, comprising the stereo cameras 28, but also the position detection unit 46. The position detection unit 46 is configured for detecting a position and/or orientation of the head 30 of the user in the passenger transport area 4. The control unit 10 of the noise reduction system 20 is then configured to select position PX as a main virtual microphone position, which is by way of an example only the position referred to as PX. This selection can be made out of the plurality of predetermined positions P1, P2 . . . PN of the virtual microphones in the noise reduction area 14. However, it is also possible to determine the position PX while disregarding the grid in which the remaining positions P1, P2 . . . PN are arranged. The main microphone position PX can be the position adjacent to an estimated position of an ear of the user. The averaging unit 44 is configured to overweight the error signal E(PX) of this main virtual microphone position PX when calculating the average error signal EA.

Figure 6:
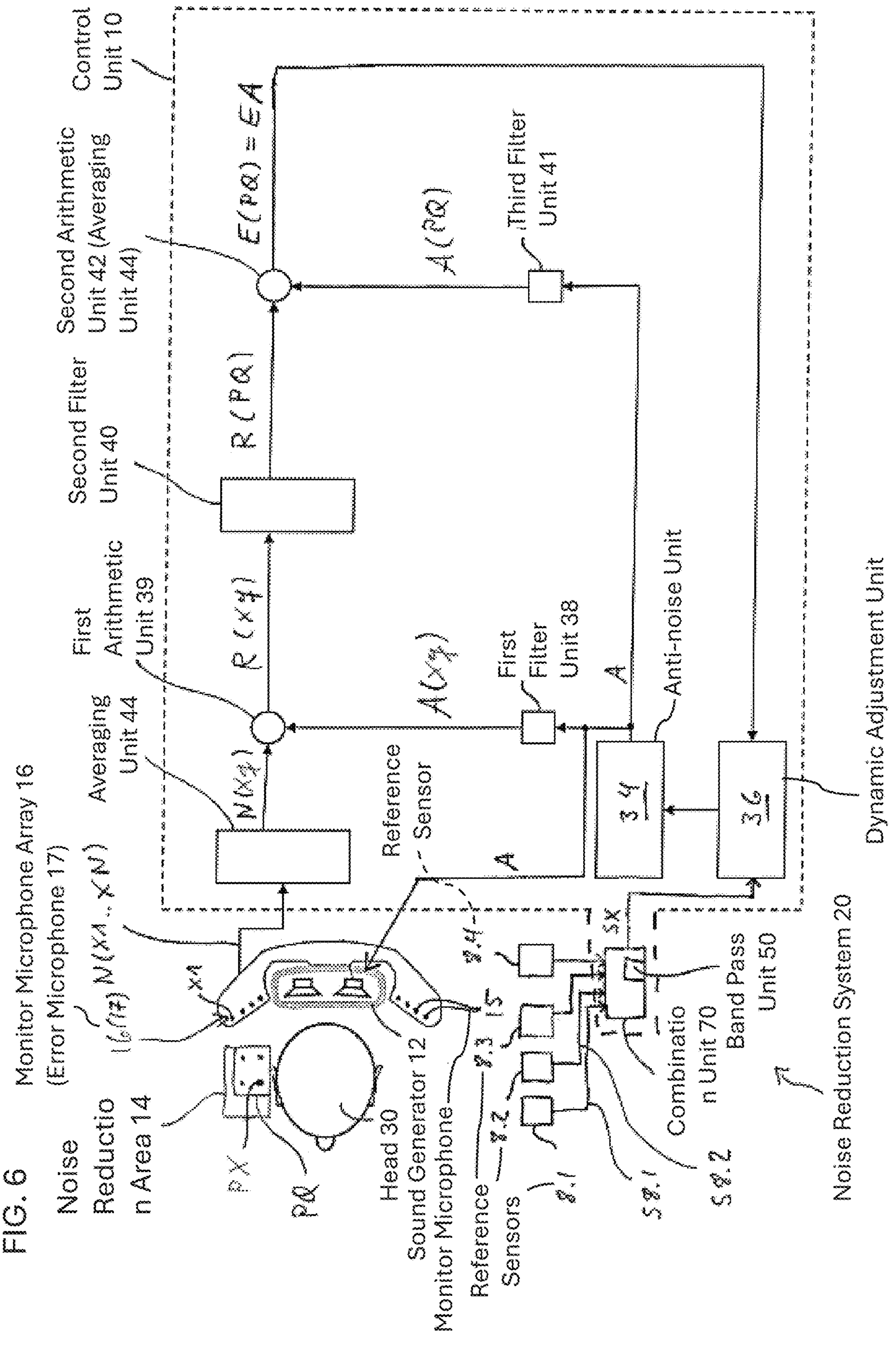

There is a further embodiment of the noise reduction system 20, which is illustrated in FIG. 6. Units of this embodiment having the same reference numerals as in FIG. 5 have the same functionality as explained with reference to this figure and are therefore not repeatedly explained. The control unit 10 comprises the anti-noise unit 34, the dynamic adjustment unit 36 and the combination unit 70. The functionality of these units has been explained with reference to FIG. 5. Unlike the before explained embodiment, there is an averaging unit 44, which is configured to receive a plurality of monitor signals N(X) of the monitor microphones 15 being located at different physical positions x and to estimate an area monitor signal N(xq). This area monitor signal N(xq) is indicative of an error signal captured by the monitor microphones 15 for a predetermined area xq of the monitor microphones 15. The first filter unit 38 is configured to receive the anti-noise signal A and to estimate a shifted area anti-noise signal A(xq). This signal is indicative of the anti-noise in the predetermined area xq. The first arithmetic unit 39 receives the shifted area anti-noise signal A(xq) and the area monitor signal N(xq). The first arithmetic unit 39 calculates an area residual signal R(xq), which is the difference between the area monitor signal N(xq) and the shifted area anti-noise signal A(xq). The second filter unit 40 receives the area residual signal R(xq) and estimates a shifted area residual signal R(PQ). The shifted area residual signal R(PQ) is the area residual signal R(xq) shifted to a predetermined virtual area PQ, which comprises more than one position P of the virtual microphones 32. The predetermined virtual area PQ is exemplarily illustrated as a subarea or section of the noise reduction area 14.

The third filter unit 41 receives the anti-noise signal A and estimates a shifted area anti-noise signal A(PQ), which is indicative of the anti-noise in the predetermined virtual area PQ. The averaging unit 44 further comprises the second arithmetic unit 42, which is configured to receive the shifted area residual signal R(PQ) and the shifted area anti-noise signal A(PQ). The second arithmetic unit 42 further estimates the error signal E(PQ) for the predetermined virtual area PQ as the average error signal EA. The average error signal EA is again feedback to the dynamic adjustment unit 36 so as to adapt or optimize the parameter of the anti-noise unit 34.

In the above embodiments the combination unit 70, which is a multiple input single output device (MISO-device), a virtual reference signal SX is calculated, which enhances the noise canceling effect without a need for parallel processing. The combinational logic of the combination unit 70 increases the coherence of the multiplicity of reference signals S8.1 . . . S8.4 in a single general virtual reference signal SX.

The various units described as part of the control unit 10 in FIGS. 3-6 can be implemented as a single controller configured to perform each of the functions of the various units therein or as separate controllers or computing modules within the control unit 10 and can each be configured as dedicated hardware circuits or software implemented on hardware controllers/computing modules.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCES

2 vehicle
4 passenger transport area
6 noise source
8, 8.1 . . . 8.4 reference sensor
10 control unit
12 sound generator
14 noise reduction area
14*a* left noise reduction area
14*b* right noise reduction area
15 monitor microphone
16 monitor microphone array
17 error microphone
20 noise reduction system
22 seat
24 headrest
26 head tracking system
28 stereo cameras
30 head
32 virtual microphone
34 anti-noise unit
34*a* first anti-noise unit
34*b* second anti-noise unit
36 dynamic adjustment unit
36*a*, first dynamic adjustment unit
36*b* second dynamic adjustment unit
38 first filter unit
39 first arithmetic unit
40 second filter unit
41 third filter unit
42 second arithmetic unit
44 averaging unit
46 position detection unit
50 band pass unit
51 second band pass unit
70 combination unit
70*a* first combination unit
70*b* second combination unit
80 secondary path unit
82 summing unit
S8, S8 . . . S8.4 reference signal
SX virtual reference signal
SXa first virtual reference signal
SXac corrected first virtual reference signal
SXb second virtual reference signal
SXbc corrected second virtual reference signal
SXc corrected virtual reference signal
A anti-noise signal
A1 first anti-noise signal
A2 second anti-noise signal
N monitor signal
R residual signal
E error signal
P virtual microphone position
PQ predetermined virtual area
EA average error signal
PX main virtual microphone position
x physical microphone position
xq predetermined area
A(x) shifted anti-noise signal
A(xq) shifted area anti-noise signal
N(x) monitor signal
N(xq) area monitor signal
R(x) residual signal
R(xq) area residual signal
R(P) shifted residual signal
R(PQ) shifted area residual signal
A(P) shifted anti-noise signal
A(Pq) shifted area anti-noise signal
E(P) error signal for position P
E(PQ) error signal for the virtual area PQ

What is claimed is:

1. A noise reduction system for actively compensating background noise generated by a noise source in a noise reduction area in a passenger transport area of a vehicle, the noise reduction system comprising:
- a controller comprising hardware;
- a sound generator for generating anti-noise for superimposing the anti-noise with the background noise in the noise reduction area for active reduction of the background noise;
- an error microphone being configured to pick up background noise emitted by the noise source and anti-noise emitted by the sound generator; and
- a plurality of reference sensors for detecting the background noise of the noise source, the plurality of reference sensors being arranged at different positions in the vehicle, wherein each reference sensor of the plurality of reference sensors is configured to generate a reference signal, at least two reference sensors of the plurality of reference sensors being coupled to the controller, wherein:
  - a noise canceling technique is implemented in the controller to generate an anti-noise signal for driving the sound generator, the controller being configured to:
    - receive reference signals of the at least two reference sensors;
    - decorrelate the reference signals of the at least two reference sensors;

determine a virtual reference signal from the decorrelated reference signals; and generate the anti-noise signal on a basis of the virtual reference signal;

the error microphone is a virtual error microphone implementing a monitor microphone array having a plurality of monitor microphones and a virtual sensing technique being implemented in the controller to estimate an error signal at a position of a virtual microphone;

the virtual microphone is located in the noise reduction area and the error signal is indicative of a summation between the background noise and the anti-noise at the position of the virtual microphone; and the controller is further configured to update parameters for driving the sound generator based on the error signal and so as to minimize the error signal.

2. The noise reduction system according to claim 1, wherein the controller is configured to determine the virtual reference signal from the reference signals for a future point in time.

3. The noise reduction system according to claim 1, wherein the controller is configured to implement a Wiener Filter, which is applied on the reference signals so as to determine the virtual reference signal.

4. The noise reduction system according to claim 1, wherein the controller is configured to implement a neuronal network, which is trained to determine the virtual reference signal from the reference signals.

5. The noise reduction system according to claim 4, wherein the neuronal network is a feedforward neuronal network or a recurrent neuronal network.

6. The noise reduction system according to claim 1, wherein the controller comprises:

at least a first combination unit and a second combination unit, wherein the first combination unit is coupled to a first set of reference sensors of the plurality of reference sensors and is configured to receive the reference signals of the coupled first set of reference sensors, and the second combination unit is coupled to a second set of reference sensors of the plurality of reference sensors and is configured to receive the reference signals of the coupled reference sensors, the first combination unit is configured to determine a first virtual reference signal from the reference signals and the second combination unit is configured to determine a second virtual reference signal from the reference signals; and a first anti-noise unit and a second anti-noise unit, the first combination unit being coupled to the first anti-noise unit in that the first virtual reference signal is input to the first anti-noise unit, and the second combination unit being coupled to the second anti-noise unit in that the second virtual reference signal is input to the second anti-noise unit, wherein the first and the second anti-noise units are configured to generate a first and a second anti-noise signal on a basis of the first and second virtual reference signal.

7. The noise reduction system according to claim 1, wherein the controller is further configured to apply a band pass filter on at least one of the reference signals.

8. The noise reduction system according to claim 1, wherein:

a plurality of positions are located in the noise reduction area; and the controller is configured to:

estimate at least a first error signal for a virtual microphone located at a first position and a second error signal for a virtual microphone located at a second position;

calculate an average error signal from at least the first and the second error signal; and update the parameters for driving the sound generator based on the average error signal so as to minimize the average error signal.

9. The noise reduction system according to claim 1, wherein the controller is configured to:

estimate a shifted anti-noise signal, which is indicative of the anti-noise at a physical position of one of the monitor microphones of the monitor microphone array;

calculate a residual signal, which is a difference between a monitor signal of the one of the monitor microphones and the shifted anti-noise signal at the physical position of the monitor microphone;

estimate a shifted residual signal, which is the residual signal shifted to the position of the virtual microphone;

estimate a shifted anti-noise signal, which is indicative of the anti-noise at the position of the virtual microphone; and estimate the error signal for the position of the virtual microphone by addition of the shifted residual signal and the shifted anti-noise signal.

10. A method of operating a noise reduction system for actively compensating background noise generated by a noise source in a noise reduction area in a passenger transport area of a vehicle, the noise reduction system comprising a controller comprising hardware, a sound generator, which generates anti-noise for superimposing the anti-noise with the background noise in the noise reduction area for active reduction of the background noise, an error microphone picking up background noise emitted by the noise source and anti-noise emitted by the sound generator, and a plurality of reference sensors, which detect the background noise of the noise source, the plurality of reference sensors being arranged at different positions in the vehicle, wherein each reference sensor of the plurality of reference sensors generates a reference signal, at least two reference sensors of the plurality of reference sensors being coupled to the controller, the method comprising:

implementing a noise canceling algorithm to generate an anti-noise signal for driving the sound generator;

receiving reference signals of the at least two reference sensors;

decorrelating the reference signals of the at least two reference sensors;

determining a virtual reference signal from the decorrelated reference signals; and generating the anti-noise signal on a basis of the virtual reference signal, wherein the error microphone is a virtual error microphone implementing a monitor microphone array having a plurality of monitor microphones and a virtual sensing technique implemented in the controller to estimate an error signal at a position of a virtual microphone, wherein the virtual error microphone is located in the noise reduction area and the error signal is indicative of a summation between the background noise and the anti-noise at the position of the virtual microphone, and the method further comprises updating parameters for driving the sound generator based on the error signal to minimize the error signal.

11. The method according to claim 10, further comprising the virtual reference signal from the reference signals for a future point in time.

12. The method according to claim 10, further comprising applying a Wiener Filter on the reference signals to determine the virtual reference signal.

13. The method according to claim 10, further comprising implementing a neuronal network, and inputting the reference signals in the neuronal network to determine the virtual reference signal.

14. The method according to claim 10, wherein the controller comprises at least a first combination unit and a second combination unit, wherein the first combination unit is coupled to a first set of reference sensors of the plurality of reference sensors and receives the reference signals of the coupled first set of reference sensors, and the second combination unit is coupled to a second set of reference sensors of the plurality of reference sensors and receives the reference signals of the coupled reference sensors, and the method further comprising:

the first combination unit determining a first virtual reference signal from the reference signals and the second combination unit determining a second virtual reference signal from the reference signals, and wherein the controller comprises a first anti-noise unit and a second anti-noise unit, the first combination unit is coupled to the first anti-noise unit and the first virtual reference signal s input to the first anti-noise unit, and the second combination unit is coupled to the second anti-noise unit and the second virtual reference signal is input to the second anti-noise unit, and the method further comprises the first and the second anti-noise units generating the anti-noise signal on a basis of the first and second virtual reference signal.

15. A processing apparatus for actively compensating background noise generated by a noise source in a noise reduction area in a passenger transport area of a vehicle, the processing apparatus comprising:

a controller comprising hardware, the controller being configured to:

implement a noise canceling technique to generate an anti-noise signal for driving a sound generator for generating anti-noise for superimposing the anti-noise with the background noise in the noise reduction area for active reduction of the background noise;

receive reference signals of at least two reference sensors of a plurality of reference sensors for detecting the background noise of the noise source, the plurality of reference sensors being arranged at different positions in the vehicle, wherein each reference sensor of the plurality of reference sensors is configured to generate one of the reference signals, the at least two reference sensors of the plurality of reference sensors being coupled to the controller;

decorrelate the reference signals of the at least two reference sensors;

determine a virtual reference signal from the decorrelated reference signals; and generate the anti-noise signal, for driving the sound generator, on a basis of the virtual reference signal.

* * * * *